United States Patent [19]

Plum

[11] Patent Number: 4,464,522
[45] Date of Patent: Aug. 7, 1984

[54] POLYMERS WITH PRIMARY AMINO GROUPS THEIR PREPARATION AND THEIR USE

[75] Inventor: Helmut Plum, Taunusstein, Fed. Rep. of Germany

[73] Assignee: Hoechst Aktiengesellschaft, Fed. Rep. of Germany

[21] Appl. No.: 519,554

[22] Filed: Aug. 2, 1983

[30] Foreign Application Priority Data

Aug. 4, 1982 [DE] Fed. Rep. of Germany ....... 3229047

[51] Int. Cl.³ ............................................. C08F 120/36
[52] U.S. Cl. .................................. 526/301; 525/328.4
[58] Field of Search ...................... 526/301; 525/328.4

[56] References Cited

U.S. PATENT DOCUMENTS 3,479,328 11/1969 Nordstrom .......................... 526/301
3,907,865 9/1975 Miyata ................................ 526/301

Primary Examiner—Paul R. Michl
Attorney, Agent, or Firm—Charles A. Muserlian

[57] ABSTRACT

Polymers that contain terminal amino groups and moieties of the formula (I)

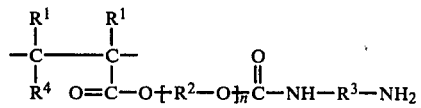

a process for preparing the polymers by (a) reacting in a first step a hydroxyl-containing ester of an α,β-olefinically unsaturated monocarboxylic or dicarboxylic acid and a dihydric alcohol with a diisocyanate, the equivalence ratio of NCO to OH groups being greater than 1:1, (b) polymerizing the reaction product of (a) alone or in mixture with at least one olefinically unsaturated polymerizable monomer by free-radical polymerization, (c) decarboxylating the polymer into the ammonium salt, and then neutralizing the resulting product and their use in 2-component finishes that crosslink by means of crosslinking agents.

16 Claims, No Drawings

POLYMERS WITH PRIMARY AMINO GROUPS THEIR PREPARATION AND THEIR USE

The present invention relates to novel polymers which contain primary amino groups, to the preparation of such compounds by acid hydrolysis of isocyanato-containing polymers, and to their use in 2-component lacquers which crosslink by means of crosslinking agents.

Polymers with primary amino groups are known. They can be prepared by prepolymerizing aminoalkyl esters of unsaturated carboxylic acids or by Hofmann degradation of polyacrylamide. However, the aminoalkyl esters of unsaturated carboxylic acids are not readily accessible; and on Hofmann degradation the end product contains only a few amino groups.

German Offenlegungsschrift No. 2,948,419 describes the alkaline hydrolysis of prepolymers having terminal isocyanate groups. It is expressly mentioned, however, that the acid hydrolysis of some isocyanates proceeds only incompletely since the amine formed in the hydrolysis reacts further with unconverted isocyanate to give the corresponding urea, and that this secondary reaction cannot be suppressed even by using a strong mineral acid in excess.

The object of the present invention is to bypass the existing difficulties and to find such polymers with primary amino groups as are simple to prepare.

The invention relates to polymers which contain terminal amino groups and moieties of the formula (I)

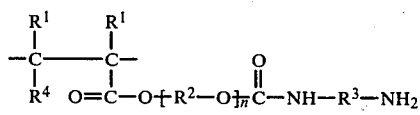

in which
$R^1$ is hydrogen or methyl,
$R^2$ is an aliphatic radical having 2 to 10, preferably 2 to 6, carbon atoms,
$R^3$ is an aliphatic radical having 3 to 19 carbon atoms, a cycloaliphatic radical having 4 to 15 carbon atoms or an aromatic radical having 6 to 13 carbon atoms,
$R^4$ is hydrogen or the radical (II)

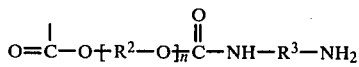

and
$n = 1$ to 10 and $R^1$ to $R^4$ can be identical or different.
$R^2$ can be an alkylene radical having 2 to 10 carbon atoms, but it is also possible for up to two oxygen ether bridges to be present in the chain; $R^3$ is preferably a hydrocarbon radical.

The invention also relates to a process for preparing the polymers through hydrolysis of isocyanates by (a) reacting in a first step a hydroxyl-containing ester of an α,β-olefinically unsaturated monocarboxylic or dicarboxylic acid and a dihydric alcohol with a diisocyanate, the equivalence ratio of NCO to OH groups being greater than 1:1, (b) polymerizing the reaction product of (a) alone or in mixture with at least one olefinically unsaturated polymerizable monomer by free-radical polymerization, (c) decarboxylating the polymer by means of excess acid and water into the ammonium salt, and then neutralizing the resulting product by adding a base.

The reaction of the invention, in which the desired polymers with primary amino groups are obtained without forming polyureas, proceeds surprisingly smoothly. The process of the invention has the advantage, compared with alkaline hydrolysis, that a reaction step can be dispensed with; this reduces not only the expenditure of work required, but also, by 50%, the amount of salt produced.

In the first reaction step (a), the hydroxyl-functional esters are conventionally reacted with the diisocyanate in the presence or absence of a solvent. The equivalence ratio of NCO to CH groups is preferably 1.5–2.5:1, in particular 2:1. Where the ratio is at least 2:1, a product is formed which comprises recurring units of formula (I).

The reaction can be carried out in the absence or, advantageously, in the presence of a conventional catalyst, for example from the group of the amines or tin compounds. The tin catalysts are advantageously used in an amount of 0.001 to 0.01, preferably 0.002 to 0.005, % by weight of tin, and the amines in an amount of 0.1 to 1, preferably 0.25 to 0.6, % by weight, in both cases relative to the amount of esters and diisocyanates used. The reaction is advantageously carried out within the temperature range from 0 to 90, preferred 10 to 50 and in particular 20° to 30° C.

Examples of suitable organic tin compounds are dibutyl tin dilaurate, acetate or versatate and tin octoate, and of amines tertiary amines, such as cyclic triethylenediamine, triethylamine and N,N-diethylethanolamine.

Examples of carboxylic acids that are suitable for use in the first reaction step as hydroxyl-carboxylates are acrylic acid, methacrylic acid, crotonic acid, maleic acid, fumaric acid and/or their possible anhydrides. Examples of dihydric alcohols used for preparing the ester are ethylene glycol, various propanediols, butanediols and hexanediols, diethylene glycol, triethylene glycol, neopentylglycol and others, singly or mixed, and also the reaction products of α,β-olefinically unsaturated monocarboxylic acids with epoxy compounds, such as ethylene oxide, propylene oxide, butylene oxide, glycide, and glycidyl esters of alkane monocarboxylic acids. It is also possible to use the monoesters of the abovementioned saturated dicarboxylic acids.

The diisocyanates used are preferably the known aliphatic, cycloaliphatic or aromatic isocyanates, for example 1,3-trimethylene diisocyanate, 1,4-tetramethylene diisocyanate, 1,5-pentamethylene diisocyanate, 1,6-hexamethylene diisocyanate, 2,2,4- and 2,4,4-trimethyl-1,6-diisocyanatohexane, dodecamethylene diisocyanate, nonadecamethylene diisocyanate, 1,2-diisocyanatocyclobutane, dicyclohexyl-4,4'-diisocyanate, dicyclohexylmethane-4,4'-diisocyanate, cyclohexylphenylmethane-4,4'-diisocyanate, m- and p-xylylene diisocyanate, 2,4- and 2,6-toluylene diisocyanate, 4,4'-diphenylmethane diisocyanate, 1-methyl-2,4- and 2,6-diisocyanatocyclohexane, 1-isocyanato-3,3,5-trimethyl-5-isocyanatomethylcyclohexane(isophorone diisocyanate), bis(3-methyl-4-isocyanatocyclohexyl)methane and 2,2-bis(4'-isocyanatocyclohexyl)propane. It is preferred to use diisocyanates whose NCO groups are of different reactivities, for example 2,4-toluylene diisocyanate and isophorone diisocyanate.

The reaction products which, depending on synthesis conditions, can contain unreacted diisocyanate and/or diurethanes are used as such or after they have been purified by extraction or distillation. It is preferred to use compounds which are free of the starting materials.

In the second reaction step (b), the reaction products of (a) are free-radical-polymerized by methods customary in the art. If the polymerization is carried out in solution, the organic solvents used can be those which are usually suitable for acrylate resins, such as aromatic hydrocarbons, for example toluene or xylene, ethers, such as dioxane or ethylene glycol dimethyl ether, or esters, such as ethyl acetate or ethylene glycol monoethyl ether acetate, but no alcohols.

The free-radical polymerization is usually initiated by means of peroxy compounds, such as peroxides, percarbonates or peresters, or azocarboximides or azocarbonitriles, singly or mixed, generally in amounts of 0.5–5, preferably 1–2, % by weight. The molecular weight regulators used can be the customary sulfur compounds, advantageously in the same amounts by weight, such as mercaptoethanol or t-dodecylmercaptan, or, for example, even dimeric α-methylstyrene.

The comonomers used for the polymerization (b) can be compounds that carry at least one α,β-olefinically unsaturated group and that are free of hydrogen atoms which are reactive towards isocyanate groups. Examples thereof are α-olefins, such as ethylene, propylene and the like, vinyl-aromatic hydrocarbons, such as styrene, α-methylstyrene or the various vinyl toluenes, esters of α,β-olefinically unsaturated carboxylic acids with monohydric aliphatic alcohols that have 1 to 18, preferably 1 to 10, carbon atoms in the alkyl group, such as the esters of acrylic acid and methacrylic acid, or the diesters of maleic acid or fumaric acid, with methanol, ethanol, the various propanols, butanols, and octyl, nonyl and decyl alcohols.

The free-radical polymerization can be carried out in the absence or presence of a solvent. It is advantageously carried out within the temperature range from 70 to 180, preferably 80 to 150, in particular 105° to 135° C. If a solvent polymerization is carried out, it is effected, for example, by continuously adding the monomers, the initiator and, if appropriate, the regulator to the reactor which contains the solvent.

The polymers (b) generally contain 2 to 14, preferably 4 to 10, % by weight of NCO groups. The mean molecular weight $\overline{M}w$ is generally below 100,000, preferably 5,000 to 20,000.

In the third reaction step (c), the isocyanato-containing polymer is dissolved in, for example, a water-miscible inert solvent, preferably a solvent that has a boiling point of about 100° C., for example dioxane, ethylene glycol dimethyl ether or diethylene glycol dimethyl ether, and the solution is slowly added to a mineral acid solution, for example concentrated hydrochloric acid or dilute, for example 10 to 50% strength, sulfuric acid. The equivalents ratio of NCO groups to $Cl^{(-)}$ or $SO_4^{2(-)}$ ions is generally 1:(1.01 to 1.5), preferably (1.1 to 1.2). The polymer is generally added within a temperature range from 10° C. to 100° C., preferably between 20° C. and 60° C. When the addition is over, the mixture is stirred until the evolution of carbon dioxide has virtually ceased. The reaction mixture is then neutralized by adding a base, for example calcium oxide, calcium hydroxide, barium oxide, barium hydroxide or, preferably, NaOH or KOH. In general, first the water is distilled out of the reaction mixture and then the salt content is removed, for example by pressure filtration. The amino-containing acrylate resins can be separated from the solvent by, for example, distillation; however, frequently direct use can be made of the solutions obtained, for example, after the pressure filtration. In many cases it is likewise possible to use water to precipitate the amino-containing polymers out of the reaction mixture; the polymer is then isolated, for example by filtration, and dried.

The polymers generally contain 0.7 to 5.8, preferably 1.4–3.5, % by weight of $NH_2$ amino groups.

The polymers of the invention can be used together with other polyfunctional compounds to prepare 2-component lacquers. Examples of suitable polyfunctional compounds are polyisocyanates, for example those mentioned above, and also isocyanato-containing acrylate resins or NCO prepolymers of polyols and polyisocyanates or polyisocyanates that contain urethane and/or biuret groups. It is preferred to use a polyisocyanate that contains biuret groups and has been formed from 3 moles of hexamethylene diisocyanate and 1 mole of water. Other suitable polyfunctional compounds are phenolic resins and polyepoxides.

The amino-containing polymers of the invention can also be used for any other amine reaction known per se, such as amide or imide formation, in reactions with polycarboxylic acids, and the like.

In the examples, % is always % by weight, unless otherwise stated.

EXAMPLES (1a) A solution of 520 g of hydroxyethyl methacrylate in 346 g of diethylene glycol dimethyl ether was added at 20° C. in the course of 8 hours to a solution of 888 g of isophorone diisocyanate and 0.3 g of dibutyltin dilaurate in 592 g of diethylene glycol dimethyl ether. 8 hours later the reaction solution had an isocyanate content of 7.2% by weight (theoretical: 7.2% by weight).

(1b) 78.3 g of the solution of Example (1a) were added dropwise at a uniform rate at 115° C. in the course of 7 hours, with stirring, together with 1.5 g of dimeric α-methylstyrene, to 18.7 g of diethylene glycol dimethyl ether; the polymerization was then brought to completion by stirring at this temperature for 1 hour. The isocyanate content of the 50% strength polymer solution was 5.4% by weight (theoretical: 5.6% by weight).

(1c) 100 g of the solution of the isocyanato-containing polymer (1b) were slowly added dropwise at 50° C. to 190 g of concentrated hydrochloric acid, and a violent $CO_2$ evolution set in. When $CO_2$ stopped evolving, the solution was neutralized with methanolic potassium hydroxide and then pressure-filtered to separate off precipitated salt. The filtrate was freed from water and methanol under reduced pressure and again pressure-filtered to give a pale yellow solution which contained 4.56% by weight of $NH_2$ (theoretical: 4.71% by weight), relative to solid resin.

(2a) 24.5 g of the solution prepared in Example (1a) were added dropwise at a uniform rate at 115° C. in the course of 6 hours, with stirring, together with 1.5 g of t-butyl peroctoate, 32.2 g of styrene and 1.5 g of dimeric α-methylstyrene, to 40.2 g of diethylene glycol dimethyl ether; the polymerization was then brought to completion by continuous stirring at this temperature for 4 hours. The isocyanate content of the 50% strength polymer solution was 1.6% by weight (theoretical: 1.7% by weight).

(2b) 1,000 g of the solution of the isocyanato-containing polymer (2a) were slowly added dropwise at 50° C.

to 68 g of concentrated hydrochloric acid, and treated as in Example (1c), to give a pale yellow solution having an $NH_2$ content of 1.31% by weight (theoretical: 1.30% by weight), relative to solid resin.

(3a) g of the solution prepared in Example (1a) were added at a uniform rate at 115° C. in the course of 6 hours, together with 1.5 g of t-butyl peroctoate, 26.3 g of methyl methacrylate and 1.5 g of dimeric α-methylstyrene, to 34.4 g of diethylene glycol dimethyl ether; the polymerization was then brought to completion by stirring at this temperature for 1 hour. The isocyanate content of the 50% strength polymer solution was 2.2% by weight (theoretical: 2.46% by weight).

(3b) 1,100 g of the polymer solution (3a) were slowly added dropwise at 50° C. to 97 g of concentrated hydrochloric acid, and violent $CO_2$ evolution set in. When the evolution of $CO_2$ had ceased, the solution was neutralized by means of methanolic potassium hydroxide, and the polymer precipitated in water. Pressure filtration and drying under reduced pressure gave 504 g (94.2% of theory) of a white powder having an $NH_2$ content of 1.65% by weight (theoretical: 1.84% by weight).

(4a) 44.0 g of the reaction solution prepared in Example (1a) were added at 125° C. in the course of 6 hours, with stirring, together with 10.3 g of styrene, 10.3 g of methyl methacrylate, 1.5 g of t-butyl peroctoate and 1.5 g of dimeric α-methylstyrene, to 32.3 g of diethylene glycol dimethyl ether; the polymerization was then brought to completion by stirring at this temperature for 3 hours. The isocyanate content of the 50% strength polymer solution was 2.85% by weight (theoretical: 3.15% by weight).

(4b) 1,100 g of the polymer solution (4a) were slowly added dropwise at 50° C. to 122 g of concentrated hydrochloric acid, and violent $CO_2$ evolution set in. When the evolution of $CO_2$ had ceased, the solution was neutralized with methanolic potassium hydroxide and then pressure-filtered to separate off precipitated salt. The filtrate was freed from water and methanol under reduced pressure and once more pressure-filtered to give a pale yellow solution having an $NH_2$ content of 2.34% by weight (theoretical: 2.25% by weight), relative to solid resin.

We claim:

1. A polymer which contains terminal amino groups and moieties of the formula (I)

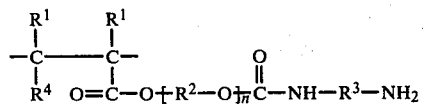

in which
R¹ is hydrogen or methyl,
R² is an aliphatic radical having 2 to 10 carbon atoms,
R³ is an aliphatic radical having 3 to 19 carbon atoms, a cycloaliphatic radical having 4 to 15 carbon atoms or an aromatic radical having 6 to 13 carbon atoms,
R⁴ is hydrogen or the radical

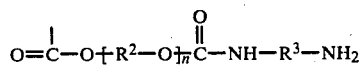

n is 1 to 10 and R¹ to R⁴ are identical or different.

2. A polymer as claimed in claim 1, which contains 0.7 to 5.8% by weight of $NH_2$ amino groups.

3. A polymer as claimed in claim 1, which contains 1.4 to 3.5, % by weight of $NH_2$ amino groups.

4. A polymer as claimed in claim 1, which contains units of the formula (I) virtually alone or also unites which derive from olefinically unsaturated polymerizable monomers.

5. A polymer as claimed in claim 1, which contains terminal amino groups in the range of 0.7 to 5.8% by weight and moieties of the formula (I) virtually alone or also units which derive from olefinically unsaturated polymerizable monomers.

6. A process for preparing a polymer of the formula (I), which comprises
(a) reacting in a first step a hydroxyl-containing ester of an α,β-olefinically unsaturated monocarboxylic or dicarboxylic acid and a dihydric alcohol with a diisocyanate, the equivalente ratio of NCO to OH groups being greater than 1:1,
(b) polymerizing the reaction product of (a) alone or in mixture with at least one olefinically unsaturated polymerizable monomer by free-radical polymerization,
(c) decarboxylating the polymer into the ammonium salt, and then neutralizing the resulting product.

7. A process as claimed in claim 6, wherein the equivalence ratio of NCO to OH groups in reaction step (a) is from 1.5–2.5:1.

8. A process as claimed in claim 6, wherein the reaction (a) is carried out in the presence of a catalyst selected from the group consisting of amines and tin compounds, the tin compounds being used in an amount of 0.001 to 0.01% by weight of tin and the amines in an amount of 0.1 to 1% by weight, in each case relative to the amount of esters and diisocyanates used.

9. A process as claimed in claim 8, wherein the reaction (a) is carried out in the presence of a tin compound being used in an amount of 0.002 to 0.005% by weight of tin, relative to the amount of esters and diisocyanates used.

10. A process as claimed in claim 8, wherein the reaction (a) in carried out in the presence of an amine used in an amount of 0.25 to 0.6% by weight, relative to the amount of esters and diisocyanates used.

11. A process as claimed in claim 6, wherein the reaction (a) is carried out at 0° to 90° C., the free-radical polymerization (b) is carried out at 70° to 180° C. as a mass or solvent polymerization in the presence of a polymerization initiator, and the acid used in step (c) is concentrated hydrochloric acid or dilute sulfuric acid, the equivalence ratio of NCO groups of the polymer (b) to the ions of the acids being 1:(1.01–1.5), and the reaction temperature being within the range from 10° to 100° C.

12. A process as claimed in claim 6, wherein the step (b) the reaction product (a) or a mixture thereof with polymerizable monomers is polymerized to yield a product having 2 to 14% by weight of NCO groups and a mean molecular weight $\overline{M}w$ of below 100,000.

13. A process as claimed in claim 12, wherein the product obtained in polymerization step (b) having 4 to 10% by weight of NCO groups and a mean molecular weight $\overline{M}w$ of 5,000 to 20,000.

14. A process as claimed in claim 6, wherein 2,4-toluylene diisocyanate or isophorone diisocyanate is used.

15. A process as claimed in claim 6, which comprises (a) reacting in a first step a hydroxyl-containing ester of an α,β-olefinically unsaturated monocarboxylic or dicarboxylic acid and a dihydric alcohol with a diisocyanate, the equivalence ratio of NCO to OH groups being 2:1, in the presence of a catalyst selected from the group consisting of amines and tin compounds, the tin compounds being used in an amount of 0.001 to 0.01% by weight of tin and the amines in an amount of 0.1 to 1% by weight, in each case relative to the amount of esters and diisocyanates used at 0° to 90° C.

(b) polymerizing the reaction product of (a) alone or in mixture with at least one olefinically unsaturated polymerizable monomer by free-radical polymerization at 70° to 180° C.

(c) decarboxylating the polymer into the ammonium salt, and then neutralizing the resulting product wherein the equivalence ratio of NCO groups of the polymer (b) to the ions of the acids is 1:(1.01–1.5).

16. A 2-component lacquer comprising the polymer of claim 1 together with a polyisocyanate, an acrylic resin containing isocyanate groups, a prepolymer of polyols and polyisocyanates or polyisocyanates containing urethane or biuret groups or both as polyfunctional compound.

* * * * *